United States Patent
Böhnig et al.

(10) Patent No.: US 8,430,082 B2
(45) Date of Patent: Apr. 30, 2013

(54) DETERMINING THE QUALITY OF FUEL IN AN AUTO-IGNITING INTERNAL COMBUSTION ENGINE

(75) Inventors: Ralf Böhnig, Bad Abbach-Lengfeld (DE); Michael Hardt, Madrid (ES)

(73) Assignee: Continental Automotive GmbH, Hannover (DE)

( * ) Notice: Subject to any disclaimer, the term of this patent is extended or adjusted under 35 U.S.C. 154(b) by 386 days.

(21) Appl. No.: 12/741,559

(22) PCT Filed: Oct. 2, 2008

(86) PCT No.: PCT/EP2008/063236
§ 371 (c)(1),
(2), (4) Date: May 5, 2010

(87) PCT Pub. No.: WO2009/062787
PCT Pub. Date: May 22, 2009

(65) Prior Publication Data
US 2010/0236524 A1    Sep. 23, 2010

(30) Foreign Application Priority Data
Nov. 15, 2007  (DE) .................. 10 2007 054 650

(51) Int. Cl.
*F02M 51/00* (2006.01)
*G06F 19/00* (2011.01)

(52) U.S. Cl.
USPC .......................... 123/493; 701/114

(58) Field of Classification Search .......... 123/445, 123/493, 436, 1 A; 701/114, 104; 73/114.38, 73/114.54, 35.02
See application file for complete search history.

(56) References Cited

U.S. PATENT DOCUMENTS

| | | | |
|---|---|---|---|
| 7,139,657 B2 | 11/2006 | Bouchain et al. | 701/104 |
| 7,333,886 B2 | 2/2008 | Bohnig et al. | 701/114 |
| 8,060,292 B2* | 11/2011 | Takahashi et al. | 701/104 |
| 8,074,503 B2* | 12/2011 | Tsutsumi et al. | 73/114.38 |
| 2006/0080025 A1 | 4/2006 | Wang et al. | 701/106 |
| 2007/0079647 A1* | 4/2007 | Aoyama | 73/35.02 |
| 2009/0177366 A1 | 7/2009 | Achleitner et al. | 701/103 |
| 2010/0088008 A1* | 4/2010 | Tanaka et al. | 701/104 |

FOREIGN PATENT DOCUMENTS

| | | |
|---|---|---|
| DE | 10257686 | 7/2004 |
| DE | 102006006303 | 6/2007 |
| DE | 102006023468 | 9/2007 |
| EP | 1074839 | 2/2001 |
| EP | 1744041 | 1/2007 |
| EP | 1900926 | 3/2008 |
| JP | 200616994 | 1/2006 |
| WO | 2005119034 | 12/2005 |

OTHER PUBLICATIONS

German Office Action for Application No. 10 2007 054 650.7 (3 pages), Jun. 27, 2008.
International Search Report for Application No. PCT/EP2008/063236 (7 pages), Mar. 6, 2009.

* cited by examiner

*Primary Examiner* — Mahmoud Gimie
(74) *Attorney, Agent, or Firm* — King & Spalding L.L.P.

(57) ABSTRACT

In order to determine the quality of fuel in an auto-igniting internal combustion engine, a defined fuel amount is injected at defined crank shaft angles during a deceleration fuel shut-off phase of the internal combustion engine. The thereby created crankshaft torque contribution is detected and an absolute or relative measure is determined for the fuel quality thereof.

17 Claims, 2 Drawing Sheets

DETERMINING THE QUALITY OF FUEL IN AN AUTO-IGNITING INTERNAL COMBUSTION ENGINE

CROSS-REFERENCE TO RELATED APPLICATIONS

This application is a U.S. National Stage Application of International Application No. PCT/EP2008/063236 filed Oct. 2, 2008, which designates the United States of America, and claims priority to German Application No. 10 2007 054 650.7 filed Nov. 15, 2007, the contents of which are hereby incorporated by reference in their entirety.

TECHNICAL FIELD

The invention relates to a method for determining fuel quality in an auto-igniting internal combustion engine and to a corresponding device.

BACKGROUND

Fuel quality plays a significant role in the operation of an internal combustion engine. In auto-igniting internal combustion engines the quality of the fuel is critically important for the ignition of the fuel. For diesel fuels, therefore, the cetane number is usually specified, this number being a measure for how fast the fuel combusts in a diesel-powered internal combustion engine. In auto-igniting internal combustion engines the fuel is ignited by means of the compression heat. In addition to other parameters, such as compression level, crankshaft angle and fuel quantity, the cetane number in particular also influences the ignition quality following an injection. An auto-igniting internal combustion engine which is operated with fuel having a comparatively low cetane number is reluctant to start, runs more roughly and louder, and has poorer exhaust gas emission values. Fuels having a higher cetane number lead to faster ignition than fuels having a lower cetane number.

Since the cetane number therefore has an effect on the operating characteristics and in particular on the exhaust gas properties of an internal combustion engine, it is becoming an increasingly common practice to provide fuel quality sensors in the fuel supply tract of an internal combustion engine in order to measure the fuel quality. Even a deviation from a nominal fuel quality due to time-related and/or regional factors can then remain without undesirable consequences for the operation of the internal combustion engine.

SUMMARY

Since fuel quality sensors are, of course, expensive components and complicate the design of a fuel supply system, according to various embodiments a method for determining the fuel quality in an auto-igniting internal combustion engine as well as a corresponding device can be achieved.

According to an embodiment, in a method for determining the fuel quality in an auto-igniting internal combustion engine, a defined fuel quantity which differs by a specific amount from the fuel quantity required for the operating state is injected at defined crankshaft angles during a deceleration fuel cutoff phase of the internal combustion engine, the crankshaft torque contribution effected thereby is recorded, and an absolute or relative measure for the fuel quality is calculated therefrom.

According to a further embodiment, the method can be repeated and a statistical evaluation or an averaging over the recorded crankshaft torque contributions or determined measured values for the fuel quality can be performed. According to a further embodiment, the method can be repeated with at least one further crankshaft angle. According to a further embodiment, the crankshaft torque contributions determined for different crankshaft angles or measured values for the fuel quality can be linked in a linear regression in order to obtain an improved measure for the fuel quality.

According to another embodiment, a device for determining the fuel quality in an auto-igniting internal combustion engine, may comprise a control unit for influencing the operation of the internal combustion engine, which control unit controls the internal combustion engine for the purpose of performing one of the above described methods and performs the necessary calculations.

BRIEF DESCRIPTION OF THE DRAWINGS

The invention is explained in more detail below by way of example with reference to the figures of the drawings, in which.

DETAILED DESCRIPTION

According to various embodiments, in a method for determining the fuel quality in an auto-igniting internal combustion engine, a defined fuel quantity which differs by a specific amount from the fuel quantity required for the operating state is injected at defined crankshaft angles during a deceleration fuel cutoff phase of the internal combustion engine, the crankshaft torque contribution effected thereby is recorded, and an absolute or relative measure for the fuel quality is calculated therefrom.

According to another embodiment, a device for an auto-igniting internal combustion engine may perform the aforesaid method. According to various embodiments, the effect that a fuel injection has on the crankshaft torque is greatly dependent on the fuel quality. If a favorable operating point at which the operating parameters of the internal combustion engine are otherwise constant is thus chosen it is possible to determine the fuel quality by injecting fuel and converting the difference in the crankshaft torque from the crankshaft torque that would result in the case of a standard fuel into a deviation from the standard fuel quality or by absolutely calculating directly from the crankshaft torque an absolute measure for the fuel quality. Determining the torque contribution of an injection is known in the prior art and is now used for determining the fuel quality.

Just a single sample injection can suffice to record a metric for the fuel quality. For improved measurement accuracy it is to be preferred to repeat the method while the operating parameters remain unchanged within defined limits and to perform an averaging or a suitable statistical evaluation for the crankshaft torques or fuel quality measured values then recorded.

If it transpires that at the selected, defined crankshaft angle the generated crankshaft torque or the determined measure for the fuel quality leads to possibly erroneous or implausible values, it is to be preferred to repeat the method at a changed defined crankshaft angle which may be less or greater than the angle previously used. This will be done in particular in the case of significant deviations from the standard fuel quality or in the case of a measure for the fuel quality which indicates an unusually poor- or good-quality fuel. By means of the crankshaft torques then obtained for different crankshaft angles or measured values for the fuel quality it is then possible to use a linear regression in order to obtain an improved value for the fuel quality.

Figure 1:
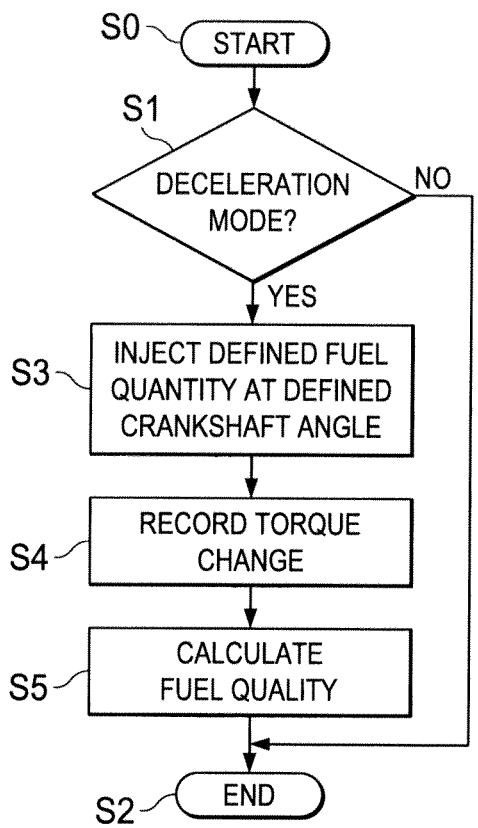
FIG. 1 shows a block diagram of a first variant of a method for determining the fuel quality of an auto-igniting internal combustion engine.

FIG. 1 is a block diagram schematically illustrating a method for determining the fuel quality in an auto-igniting internal combustion engine. After the method is started at a step S0 it is first queried at a step S1 whether the internal combustion engine is in a deceleration fuel cutoff mode of operation or in another mode of operation in which the injected fuel mass is constant within defined limits. If no such operating state is present (N branch), the method is terminated at a step S2. Determining the fuel quality only takes place (Y branch) if such an operating state is present.

Then, at a step S3, a defined fuel quantity is injected at a defined crankshaft angle. Said fuel quantity is different from the quantity otherwise provided for the operating state (zero in the case of the deceleration fuel cutoff operating mode). The difference in quantity leads to a specific change in the crankshaft torque which is recorded at a step S4. From said torque difference according to step S4, either an absolute measure for the fuel quality is determined or a relative measure is calculated taking into account the deviation from a standard value that would result in the case of a standard fuel. The method is then terminated (step S2).

If the method is operating in a deceleration fuel cutoff phase, the change in torque is an absolute torque contribution due to the injection of the defined fuel quantity.

Figure 2:
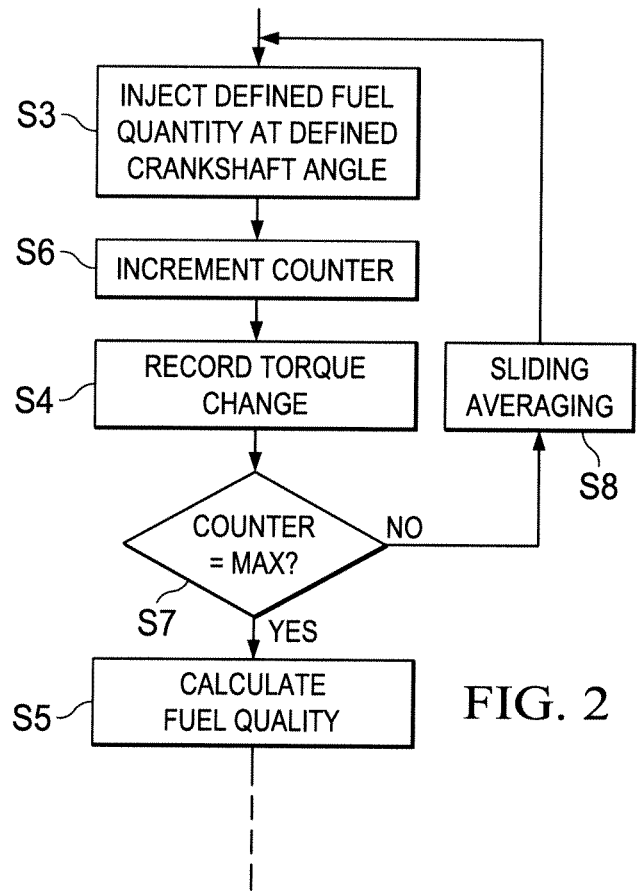
FIG. 2 shows a partial block diagram relating to a modified method for determining the fuel quality.

In order to improve the measure for the fuel quality said method can be modified in a way such as is shown in FIG. 2. FIG. 2 shows the extract part of the method according to FIG. 1 from steps S3 to S5.

In this case a counter is incremented (step S6) so that a statistical evaluation can be carried out by way of the determination of the torque or the torque difference. Step S6 is in this case arranged in the representation scheme of FIG. 2 between steps S2 and S4, though it can also be placed before step S3 or after step S4. The main thing is that it precedes a step S7 which is in turn arranged after the determination of the torque or the torque difference. A check is made at step S7 to determine whether the counter has reached a specific maximum value.

If this is not the case, a sliding averaging, for example, is performed at a step S8 over the recorded change in crankshaft torque or its deviation from standard fuel conditions. The concluding step S5 in the determination of the measured value for the fuel quality, which step is not reached until the averaging includes a defined number of loop iterations, then makes use of the averaged value for the torque or, as the case may be, the torque difference. In this way a more accurate determination of the fuel quality is reached.

In the embodiment variant shown in FIG. 2 the averaging can, of course, also include a statistical evaluation.

An averaging/statistical evaluation can also be performed on the basis of the measure for the fuel quality, instead of on the basis of the crankshaft torque or the crankshaft torque difference.

In that case step S5 will then come before step S7 and the statistical evaluation or averaging at step S8 will make use of the measure for the fuel quality.

Figure 3:
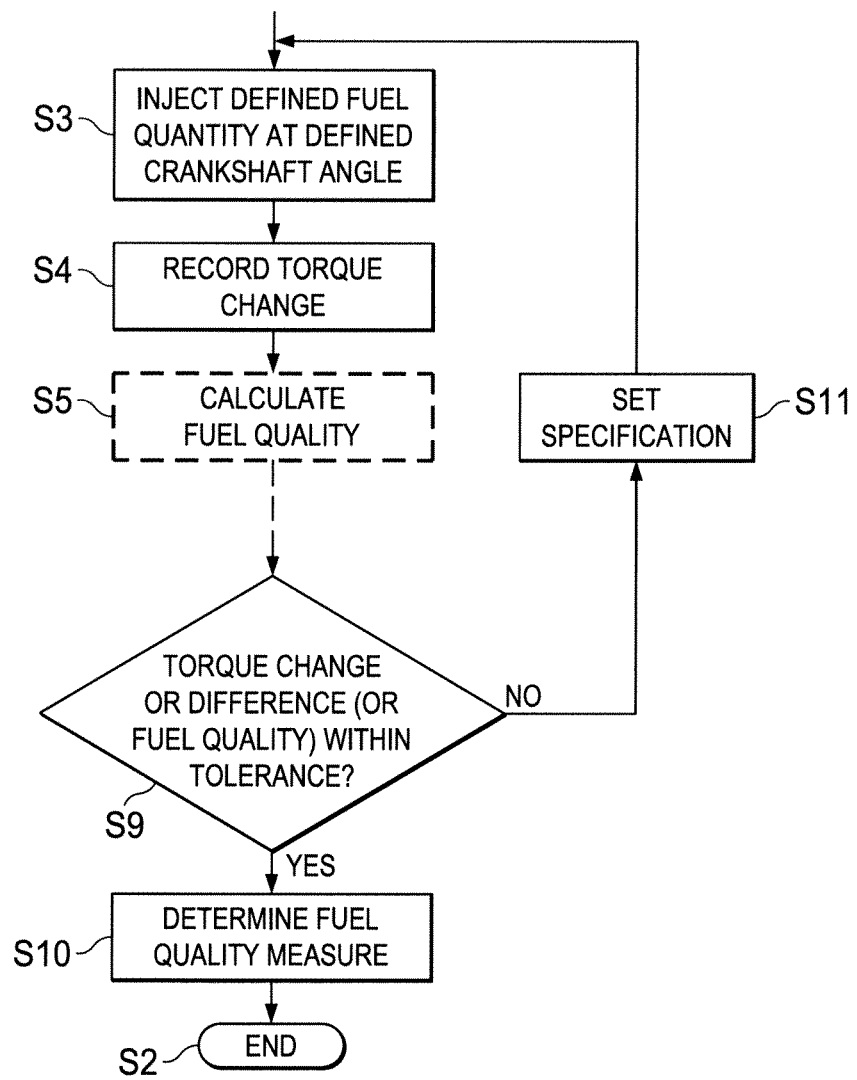
FIG. 3 shows a partial block diagram of another modified method for determining the fuel quality.

A further embodiment of the method is shown in FIG. 3. This serves to vary the defined fuel quantity and/or the crankshaft angle at which said fuel quantity is injected. This is based on the knowledge that there are specific time instants (referred to the crankshaft angle) at which the fuel quality has a particularly strong impact on the torque contribution of an individual injection.

Steps of the method according to FIG. 3 which correspond to those of the method described with reference to FIG. 1 are labeled with the same reference signs and, to the extent that it is not necessary, are not explained again. Moreover, FIG. 3 represents only an extract of the method, which extract starts only at step S3, which is, of course, in turn preceded by steps S0 and S1 as well as S2.

Characteristic of the method according to FIG. 3 is a query step S9 arranged after steps S3 and S4 (and, depending on embodiment, also S5) to determine whether the determined change in torque or, as the case may be, torque difference (or the measure for the fuel quality, if step S5 is also executed) lies within a certain tolerance range around standard values. If this is the case, the measure for the fuel quality is determined at step S10, analogously to step S5, or alternatively step S10 contains no further steps if step S5 preceded step S9 (dashed variant of FIG. 3).

If, however, a deviation from standard values is present which points to a particularly unusual fuel quality—because e.g. the determined torque difference or, as the case may be, torque change indicates a similar situation or (if step S5 was executed) the measure for the torque or, as the case may be, torque difference points thereto, a modified specification for the defined crankshaft angle and/or change in fuel quantity which is used at step S3 is set at a step S11. At the same time the value obtained at step S4 (or step S5) is assigned to the previously used defined value for the crankshaft angle and stored. Subsequently steps S3 and S4 (and, where applicable, S5) are executed once more and the query at step S9 is then skipped.

Based on the two defined crankshaft angles or changes in fuel quantity present as well as on the assigned values from step S4 (and, where applicable, S5), step S10 then performs a linear regression in which model data is used which expresses a relationship between fuel quality and torque contribution of an injection as a function of the crankshaft angle. By this means an improved indication of the fuel quality can be obtained. It is, of course, possible to perform not just two iterations of the loop of steps S3 and S4 with two different crankshaft angles/fuel quantities, but also a higher number, which then improves the linear regression.

What is claimed is:

1. A method for determining fuel quality in an auto-igniting internal combustion engine comprising:
   injecting a defined fuel quantity which differs by a specific amount from a fuel quantity required for an operating state at defined crankshaft angles during a deceleration fuel cutoff phase of the internal combustion engine,
   recording a crankshaft torque contribution effected thereby, and
   calculating an absolute or relative measure for the fuel quality from the crankshaft torque contribution.

2. The method according to claim 1, wherein the method is repeated and a statistical evaluation or an averaging over the recorded crankshaft torque contributions or determined measured values for the fuel quality is performed.

3. The method according to claim 1, wherein the method is repeated with at least one further crankshaft angle.

4. The method according to claim 3, wherein the crankshaft torque contributions determined for different crankshaft angles or measured values for the fuel quality are linked in a linear regression in order to obtain an improved measure for the fuel quality.

5. A device for determining fuel quality in an auto-igniting internal combustion engine, comprising a control unit for influencing the operation of the internal combustion engine, wherein the control unit is operable:
- to control an injection of a defined fuel quantity which differs by a specific amount from a fuel quantity required for an operating state at defined crankshaft angles during a deceleration fuel cutoff phase of the internal combustion engine,
- to record a crankshaft torque contribution effected thereby, and
- to calculate an absolute or relative measure for the fuel quality from the crankshaft torque contribution.

6. The device according to claim 5, wherein the device is further operable to repeat said injection control, recording, and calculating and to perform a statistical evaluation or an averaging over the recorded crankshaft torque contributions or determined measured values for the fuel quality.

7. The device according to claim 5, wherein the device is further operable to repeat said injection control, recording, and calculating with at least one further crankshaft angle.

8. The device according to claim 7, wherein the crankshaft torque contributions determined for different crankshaft angles or measured values for the fuel quality are linked in a linear regression in order to obtain an improved measure for the fuel quality.

9. A method for determining fuel quality in an auto-igniting internal combustion engine comprising:
- determining whether the internal combustion engine is in a deceleration fuel cutoff mode of operation or in another mode of operation in which injected fuel mass is constant within defined limits;
- if such operating state is present, injecting a defined fuel quantity at a defined crankshaft angle, wherein said fuel quantity is different from a quantity otherwise provided for a corresponding operating state;
- recording a specific change in crankshaft torque;
- determining from said change either an absolute measure for the fuel quality or calculating a relative measure taking into account a deviation from a standard value that would result in the case of a standard fuel.

10. The method according to claim 9, wherein when in a deceleration fuel cutoff phase, the change in torque is an absolute torque contribution due to the injection of the defined fuel quantity.

11. The method according to claim 9, wherein a statistical evaluation is been carried out by means of a counter and by repeating the steps of said method.

12. The method according to claim 11, further comprising the step of determining whether the counter has reached a specific maximum value.

13. The method according to claim 11, wherein an averaging of crankshaft torque values is performed.

14. The method according to claim 9, further comprising varying at least one of the defined fuel quantity and/or the crankshaft angle at which said fuel quantity is injected.

15. The method according to claim 9, further comprising the step of determining whether the determined change in torque or torque difference lies within a certain tolerance range around standard values.

16. The method according to claim 15, wherein if a deviation from standard values is present setting a modified specification for the defined crankshaft angle and/or change in fuel quantity.

17. A method for determining fuel quality in an auto-igniting internal combustion engine comprising:
- determining whether the internal combustion engine is in a deceleration fuel cutoff mode of operation or in another mode of operation in which an injected fuel mass is, constant within defined limits;
- if such operating state is present, injecting a defined fuel quantity at a defined crankshaft angle, wherein said defined fuel quantity is different from a quantity otherwise provided for a corresponding operating state;
- recording a specific change in crankshaft torque;
- determining from said change either an absolute measure for the fuel quality or calculating a relative measure taking into account a deviation from a standard value that would result in the case of a standard fuel; and
- performing a linear regression in which model data is used which expresses a relationship between fuel quality and torque contribution of an injection as a function of the crankshaft angle.

* * * * *